R. Hatch, Jr.
Farm Gate.
N° 96,106. Patented Oct. 26, 1869.
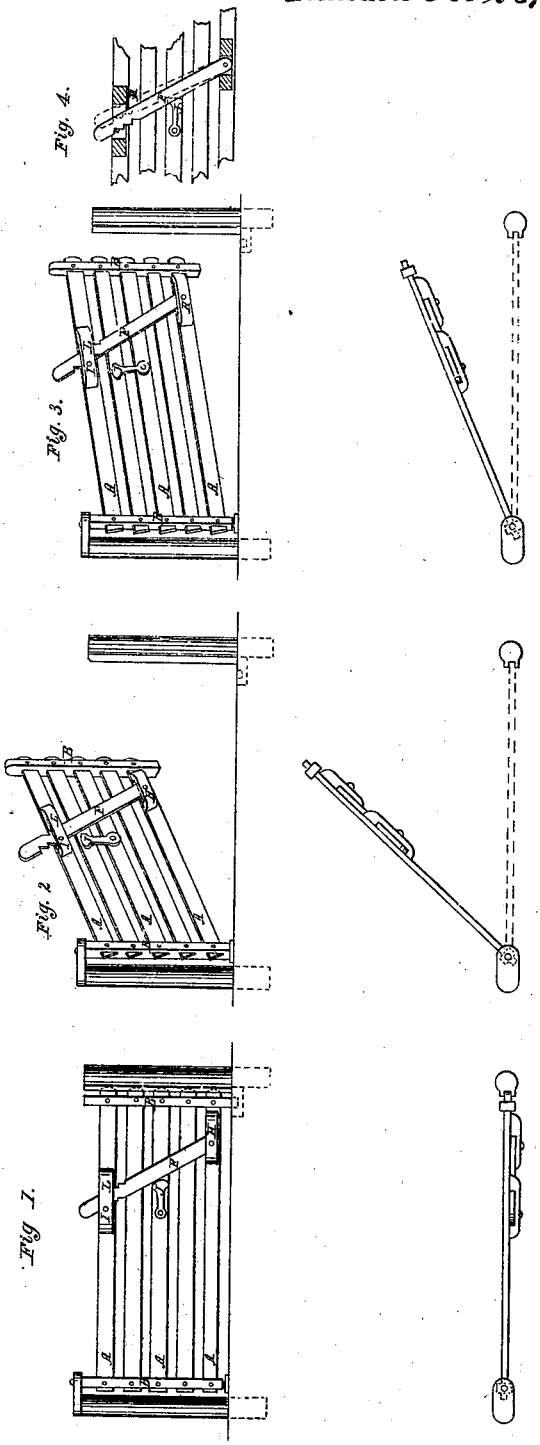
Witnesses:
E. S. Pratt,
Milton Spencer
Inventor:
Reuben Hatch Jr.

United States Patent Office.

REUBEN HATCH, JR., OF TRAVERSE CITY, MICHIGAN.

Letters Patent No. 96,106, dated October 26, 1869.

IMPROVEMENT IN GATES.

The Schedule referred to in these Letters Patent and making part of the same.

I, REUBEN HATCH, Jr., of Traverse City, in the county of Grand Traverse, and State of Michigan, have invented certain Improvements in Farm-Gates, of which the following is a specification.

Nature and Objects of the Invention.

My invention relates to the attachment of a slat or bar to one side of a farm-gate, loosely constructed of horizontal bars, in such a manner that the end of the gate that opens will fasten itself up at any point to which it is raised, while the gate swings open on a horizontal plane; the object of my invention being to get a cheap and substantial farm-gate, that will not sag, made to be raised up above obstructions, such as snow, and at the same time swing open horizontally like an ordinary farm-gate.

Description of the Accompanying Drawings.

Figure 1 shows the gate shut.
Figure 2 shows it considerably elevated and open.
Figure 3 shows it slightly elevated and partially open.
Figure 4 shows the contrivance by which it is held up after it is raised.

General Description.

A A are the bars that compose the body of the gate, which bars are loosely inserted in vertical posts B B, and fastened by a pin in each end, so as to admit of raising the end of the gate that opens to any desired height.

F is the slat or bar, by which the gate is supported when raised. This is fastened to the lower bar of the gate at H, and extends diagonally across the side of the gate, resting on a pin in the upper bar of the gate at I. It is held in place by the cleats H and L.

J is a button, which is forced down against the bar F, thereby pressing said bar against the cleat L till the notches in the upper side thereof catch, to fasten the gate shut, as shown at M in fig. 4.

The gate is opened by raising, with the hand, the end that opens, which, in a loosely-made gate, is easily done. This thrusts the bar F up, as the distance between the points H and I is shortened, and causes the notches in the lower side of the bar F to pass over the pin at I, and catch whenever the power that raises the gate is withdrawn, and the end of the gate will remain suspended above the ground.

When the gate is raised to the desired height, it is swung open horizontally either way.

It is shut by throwing the bar F off from the pin I, when the gate will drop into its place.

It can be fastened open by unhooking the bar F, when the gate will drop on to the ground.

The bar F can be put across the gate in the opposite direction from that shown in the drawing, in which case the notches must be in the post B, or it can be fastened at either end with the notches at the other.

Claim.

I claim, as my invention—

The combination of the bar F, having notches on each side, with the button J and the gate herein described, substantially as and for the purpose hereinbefore set forth, whereby the gate may be fastened either open or shut, and when the gate is being opened, the bar F is self-acting.

REUBEN HATCH, JR.

Witnesses:
E. S. PRATT,
MILTON SPENCER.